United States Patent [19]

Baumgartner

[11] 4,320,477

[45] Mar. 16, 1982

[54] ENERGY SYSTEM FOR ELECTRONIC WATCH

[75] Inventor: Werner R. Baumgartner, Orpund, Switzerland

[73] Assignee: Bulova Watch Co., Inc., Flushing, N.Y.

[21] Appl. No.: 205,191

[22] Filed: Nov. 10, 1980

[30] Foreign Application Priority Data

May 16, 1980 [CH] Switzerland .......................... 3832/80

[51] Int. Cl.$^3$ ............................ G04B 1/00; H02J 7/00

[52] U.S. Cl. ........................................ 368/64; 368/66; 368/204; 320/61

[58] Field of Search ................... 368/64, 66, 203, 204, 368/205; 320/2-4, 21, 61

[56] References Cited

U.S. PATENT DOCUMENTS

Re. 29,637 5/1978 Takamune et al. .................. 368/66
3,214,670 10/1965 Schaf .............................. 368/203 X
3,998,043 12/1976 Tamaru et al. ....................... 368/66
4,006,583 2/1977 Vuilleumier ......................... 368/64
4,106,279 8/1978 Martin et al. ........................ 368/64
4,137,493 1/1979 Smith .................................. 320/21
4,144,704 3/1979 Portmann ............................ 368/64
4,165,477 8/1979 Comte ............................ 368/205 X
4,182,110 1/1980 Kamiwaki et al. .................. 368/64
4,223,522 9/1980 Nomura et al. ....................... 368/66

FOREIGN PATENT DOCUMENTS 54-136873 10/1979 Japan ................................. 368/205

*Primary Examiner*—Vit W. Miska
*Attorney, Agent, or Firm*—Michael Ebert

[57] ABSTRACT

An energy system for powering an electronic watch having a digital or analog time display, the system comprising a primary power source, such as a thermoelectric generator or solar cell, whose output is fed to an energy converter to produce an operating voltage for the electronic circuits and time display of the watch. The system further includes a buffer accumulator that is charged by the energy converter and acts to maintain the operation voltage when the primary source is inactive, thereby providing an uninterrupted supply of operating voltage. The watch also includes a status indicator which senses the prevailing condition of the energy system to produce a signal indicative thereof perceptible to the user of the watch.

9 Claims, 1 Drawing Figure

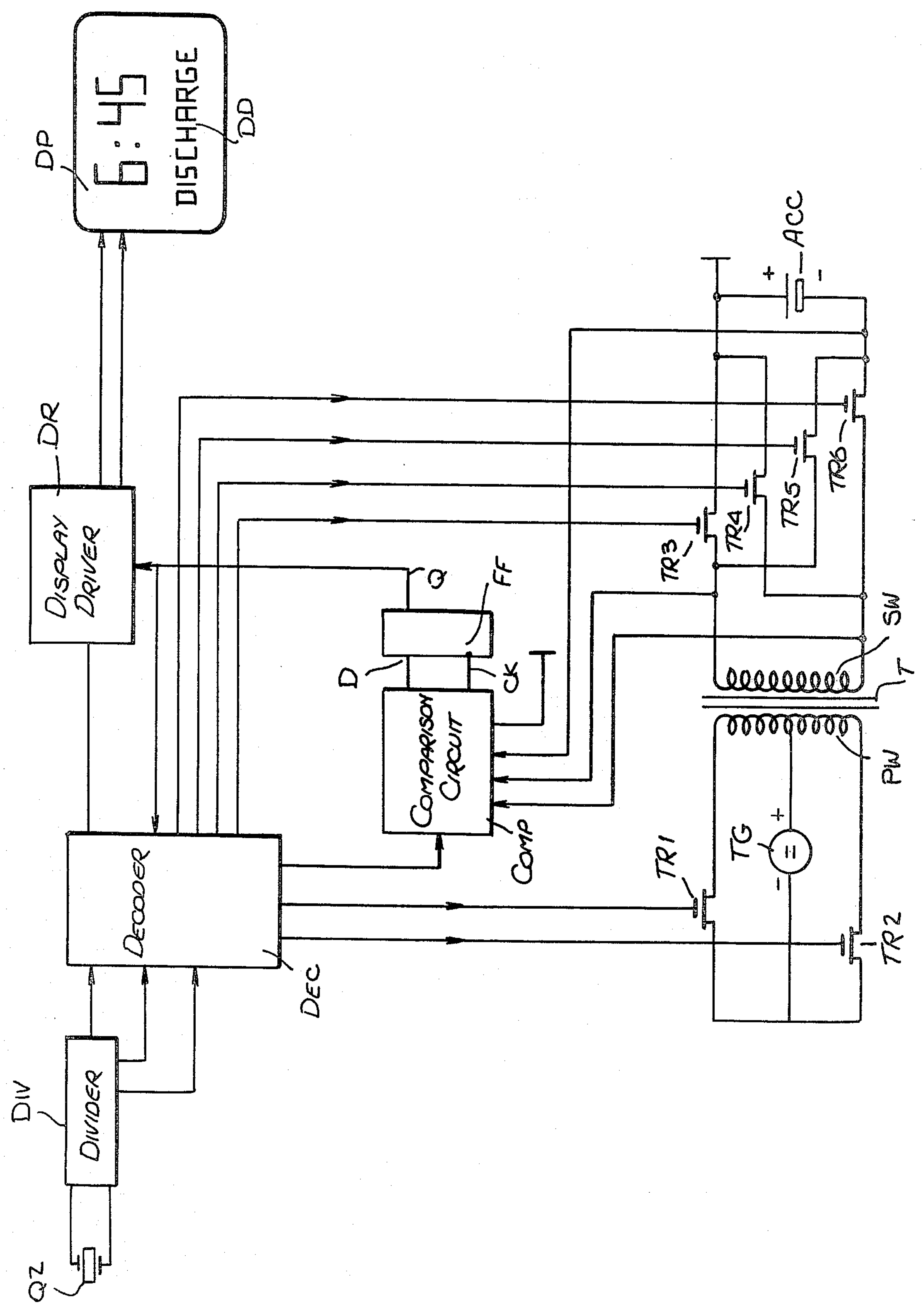
DP
6:45
DISCHARGE
DD
DR
Display Driver
Q
FF
D
CK
Comparison Circuit
COMP
Decoder
DEC
Divider
DIV
QZ
TR1
TR2
TR3
TR4
TR5
TR6
TG
ACC
SW
T
PW

ENERGY SYSTEM FOR ELECTRONIC WATCH

BACKGROUND OF INVENTION

This invention relates generally to an energy system for an electronic watch which includes a primary power source whose voltage is fed to an energy converter to produce an operating voltage for the watch and also acting to charge a buffer accumulator which maintains this voltage, and more particularly to an arrangement in a watch of this type for continuously monitoring the energy system and for providing a signal indicative of its status.

Electronic watches of modern design include a high-frequency quartz crystal oscillator functioning as a frequency-standard or time base, the high-frequency output thereof being applied to a frequency divider which yields timing pulses that serve to drive a digital LCD or LED time display or to actuate the stepping motor of an analog time display.

Energy systems are known for such watches which make use of a thermoelectric generator, a solar cell or mechanically-operated means as a primary power source, the source being coupled to an energy converter in an arrangement which produces an uninterrupted operating voltage for the watch.

Thus in the case of a wristwatch equipped with thermoelectric or Peltier elements adapted to exploit the temperature gradient established between the back of the watch case which is in physical contact with the wrist of the wearer and another part of the case thermally insulated from the back, no primary power is generated when the watch is not worn on the wrist. It is for this reason, a watch using a thermoelectric generator in conjunction with an energy converter must also include a buffer accumulator capable of assuring the continuous operation of the watch should the primary source be rendered inactive.

In normal operation of a watch of this type, the voltage obtained from the energy converter is sufficient to operate the electronic circuits of the watch and the ditital or analog display thereof, and also to charge the buffer accumulator. However, should the energy converter voltage become zero or be reduced to a level insufficient to operate the watch, the buffer accumulator which then supplies the necessary operating voltage can only keep the watch going for a relatively limited period of time before it is exhausted.

An electronic watch having an energy system which relies on a buffer accumulator to maintain the operating voltage almost inevitably requires more attention than a watch powered by a replaceable battery. For this reason, information as to the existing status of the energy system would be useful to the manufacturer of the watch, as well as to watch dealers and watch users. Of particular interest in this regard is information as to whether, at any given time, the accumulator is being charged or discharged.

For example, if the watch has been strapped to the wrist of the wearer for several hours so that the primary thermoelectric power source is presumably active, information indicating that the accumulator was then discharging would indicate a defective operation; for under these circumstances the accumulator should be charging.

In electronic watches operated by an energy system of the type described, no means have heretofore been provided to indicate the operating status of the system. Thus in the case of an energy system for a watch utilizing a solar cell, since one has no information as to whether at a given time the accumulator is in a charged state, in order to prevent excessive discharge of the accumulator, the user has to depend on frequent exposure of the watch cell to light to avoid an undue discharge. Even in the case of thermoelectrically-operated watches, no means have heretofore been provided to improve the dependability of the watch by monitoring the status of the energy system.

SUMMARY OF INVENTION

In view of the foregoing, the main object of this invention is to provide in an electronic watch having an energy system which includes a primary source and an energy converter therefor associated with a buffer accumulator, a status indicator adapted to monitor and indicate to an interested party the status of the system, the indication assuming a visual, sonic or other readily perceptible form.

In the case of watches of the above type which include control circuits that function automatically to disconnect the energy converter from the electronic circuits and display of the watch and to switch in the accumulator when the voltage from the converter falls below an acceptable level, these control circuits can be used to advantage in the present invention to indicate to the user of the watch the status of the energy system.

In a status indicator in accordance with the invention, the status indication may take the form of a "transfer signal" indicative of a change in status, such as when the accumulator switches from a charging to a discharging state, this being indicated by a sonic or other warning signal. Or the status indication may take the form of an "information signal" which provides a continuous indication for the duration of a given operation condition, such as when the accumulator is being charged or discharged.

A significant advantage of a status indicator for an energy system in an electronic wave is that it makes it possible to draw conclusions as to the proper use and handling of the watch. Thus one can in very simple fashion and without special expert knowledge determine whether the energy system is functioning correctly. A status indicator in accordance with the invention facilitates verification of the operation of the watch after manufacture as well as facilitating the demonstration of the watch by the dealer and monitoring of watch operation during use.

Also an object of the invention is to provide a status indicator for an energy system in an electronic watch which is of relatively simple and inexpensive design and which operates efficiently and reliably.

Briefly stated, these objects are attained in an electronic watch having an energy system which includes a primary source and an energy converter therefor associated with a buffer accumulator that is charged by the converter, the converter normally supplying an operating voltage for the electronic circuits and time display of the watch, the accumulator acting to supply the operating voltage when the primary source is rendered inactive. The watch further includes a status indicator provided with means to sense the condition of the energy system and to generate a signal perceptible to the user indicative thereof.

OUTLINE OF DRAWING

For a better understanding of the invention, reference is made to the following detailed description thereof to be read in conjunction with the annexed drawing whose single FIGURE schematically illustrates an electronic watch having an energy system provided with a status indicator.

DESCRIPTION OF INVENTION

Referring now to the drawing, there is shown a preferred embodiment of a digital-display electronic wristwatch in accordance with the invention whose power is provided by a thermogenerator TG. In practice, this may consist of several thermoelectric elements connected in series.

Thermogenerator TG exploits the temperature gradient established between the back of the watch case which makes physical contact with the relatively warm wrist of the wearer and the cooler upper part of the case that is thermally-insulated from the back, this temperature gradient giving rise to a voltage output. Because a voltage generated in this manner is very small, it is normally insufficient to operate the electronic circuits and time display of the watch.

It is for this reason that the voltage generated by thermogenerator TG must be raised to an appropriate level by a DC voltage energy converter. In the embodiment shown, the converter comprises two chopper transistors TR1 and TR2 connected to the ends of a center-tapped primary PW of a transformer T. Thermogenerator TG is connected between the center-tap of the primary and the function of the two transistors. The chopper transistors are alternately rendered conductive, thereby applying the thermoelectric voltage to alternative halves of the primary winding to produce an alternating voltage in transformer secondary SW which is full-wave rectified by a rectifier circuit constituted by four MOS-FET transistors TR3 to TR6. The output of this rectifier circuit is applied to buffer accumulator ACC.

Chopper transistors are periodically actuated by means of a decoder circuit DEC coupled to an intermediate stage of a frequency divider DIV whose input is connected to a high-frequency quartz crystal-controlled oscillator QZ. In practice, the actuating frequency applied to the chopper transistors may be 8192 Hz. Decoder DEC is also coupled to a display driver DR and serves to apply timing pulses thereto derived from divider DIV. These timing pulses serve to actuate a digital display system DP which may be constituted by LCD stations to afford hour and minute time indications, such as 6:45.

Decoder DEC sees to it, among other things, that the set of transistors TR3 to TR6 is controlled in synchronism with chopper transistors TR1 and TR2 so that the set carries out a full-wave rectification function. A more detailed description of a converter of this type may be found in the copending application Ser. No. 143,610, filed Apr. 25, 1980, of Hans-Rudolf Sutter, entitled "D-C Voltage Converter," whose entire disclosure is incorporated herein by reference.

Also provided is a comparison circuit COMP which is operatively coupled to decoder DEC so that it periodically (i.e., every second) compares the voltage developed across the secondary SW of transformer SW with the voltage established across accumulator ACC. The output of comparison circuit COMP is applied to a flip-flop FF whose state depends on the comparison carried out by the comparison circuit. Flip-flop FF has two inputs D (data) and Ck (clock) which are connected to comparison circuit COMP and an output Q connected to display driver DR and decoder DEC.

When the watch is worn on the wrist and the thermoelectric generator TG is active, the energy converter produces the required operating voltage for the electronic circuits and for the time display which in the embodiment shown is a digital display. In this condition the energy converter also acts to charge accumulator ACC. When, however, the watch is not worn and the thermoelectric generator is inactive, accumulator ACC serves to supply the required operating voltage, the accumulator then discharging.

Comparison circuit COMP switches the watch automatically from thermogenerator to accumulator operation as soon as the voltage of the former falls below a predetermined level, the drop in voltage occurring when the watch is not worn or when it is loosely strapped on the wrist or the wearer and fails to make good physical contact with the wrist.

To this end, comparison circuit COMP which receives a timing signal from decoder DEC periodically compares the voltage tapped out of secondary winding SW of the transformer with the voltage of accumulator ACC, the state of flip-flop FF depending on the result of this comparison. Thus the accumulator voltage serves as a reference voltage. In practice, another reference voltage source may be used. Thus when the secondary output is high because the thermoelectric generator TG is active, the Q output of the flip-flop will be in one state, and when the secondary output is low because the generator is inactive, the Q output will be in another state.

The Q output of flip-flop FF is adapted to driver DR for time display DP, which in this embodiment includes liquid crystal display stations to provide a time reading. Display DR further includes an additional liquid crystal display element DD which provides a status indication for the energy system.

In the drawing, the status indication takes the form of the term "Discharge" or "Charge." Thus in normal operation with the watch worn on the wrist, when the thermoelectric generator is active and the energy converter is then charging the accumulator, the term "Charge" will appear; whereas when the thermoelectric generator is inactive and the operating voltage for the watch is being supplied by the accumulator, then the term "Discharge" will appear on the display. In this example, the status indicator affords an "information signal" which indicates the prevailing condition for its full duration.

In practice, a "transfer signal" may also be produced each time the system switches from the charge to the discharge state, this warning signal being in sonic or visual form. Or to indicate that the accumulator is discharging, one could provide a warning signal by causing one of the digital time display elements to blink periodically. And in the case of an analog display having a seconds hand driven by the stepping motor, the motor operation may be caused by the status indicator to produce an abnormal movement of the seconds hand. Thus instead of the seconds hand moving in one-second increments, it may be caused to take two short steps per second when the accumulator is discharging to indicate this condition.

Alternatively, instead of a word such as "Charge" to indicate status, an arrow or other warning symbol may be presented by the display. The invention therefore encompasses any form of indication that is readily recognizable by an observer to provide information as to the status of the energy system.

While there has been disclosed a preferred embodiment of a status indicator in accordance with the invention, the invention includes other embodiments. Thus instead of periodically comparing the voltage of the energy converter with that of the accumulator, the status indicator may be arranged to sense only the operating condition of the accumulator; that is, whether it is charging or discharging, or arranged in some other manner to sense the status of the accumulator to provide a signal indicative thereof.

I claim:

1. An energy system for an electronic watch having electronic circuits requiring a predetermined operating voltage and a time display actuated thereby, said system comprising:

(A) a primary power source which, when active, produces an output voltage which differs from the said predetermined voltage;

(B) an energy converter coupled to said source to produce said predetermined voltage for operating said circuits and said display;

(C) a buffer accumulator coupled to the output of the converter and charged thereby:

(D) control means responsive to the condition of said primary source to supply the output of the accumulator to the electronic circuits and to said display to provide operating voltage therefor when the source is inactive; and (E) a status indicator including detection means to sense the condition of said energy system and to provide a perceptible signal indicative thereof, said detection means including a comparison circuit which compares a voltage derived from the converter with a voltage taken from the accumulator to produce an output from which said signal is derived.

2. A system as set forth in claim 1, wherein said detection means is coupled to said accumulator to produce said signal when the accumulator is being discharged.

3. A system as set forth in claim 1, wherein said electronic watch includes a high-frequency time base whose output is applied to a frequency divider which yields timing pulses for actuating said display.

4. A system as set forth in claim 1, wherein said comparison circuit is activated at periodic intervals by pulses derived from said divider.

5. A system as set forth in claim 3, wherein said time display is a digital display formed by liquid crystal display stations, and said status signal is produced by additional liquid crystal display elements.

6. A system as set forth in claim 3, wherein said time display is a digital display formed by liquid crystal display stations and said status signal is produced by causing one of said stations to blink periodically.

7. A system as set forth in claim 1, wherein said status signal is constituted by a word indicative of whether the accumulator is charging or discharging.

8. A system as set forth in claim 1, wherein said detection means is coupled to said control means to produce said signal each time said accumulator acts to supply said operating voltage.

9. A system as set forth in claim 1 wherein said primary power source is constituted by a thermoelectric element which is active only when it is thermally coupled to the wrist of the wearer of the watch.

* * * * *